United States Patent
Arai et al.

(10) Patent No.: US 10,830,791 B2
(45) Date of Patent: Nov. 10, 2020

(54) SAMPLE CONTAINER MOUNTING MEMBER AND SAMPLE CONTAINER SEALING METHOD

(71) Applicant: Shimadzu Corporation, Kyoto (JP)

(72) Inventors: Hiroshi Arai, Kyoto (JP); Akinori Kogure, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/297,138

(22) Filed: Mar. 8, 2019

(65) Prior Publication Data

US 2019/0353680 A1 Nov. 21, 2019

(30) Foreign Application Priority Data

May 18, 2018 (JP) .................................. 2018-096133

(51) Int. Cl.
*G01Q 30/20* (2010.01)
*G01Q 30/18* (2010.01)
*G01Q 10/06* (2010.01)

(52) U.S. Cl.
CPC ........... *G01Q 30/20* (2013.01); *G01Q 10/065* (2013.01); *G01Q 30/18* (2013.01)

(58) Field of Classification Search
CPC ........ G01Q 30/18; G01Q 30/20; G01Q 70/02; G01Q 30/08
See application file for complete search history.

(56) References Cited

U.S. PATENT DOCUMENTS

| 5,760,396 A * | 6/1998 | Lindsay ................ G01Q 20/02 850/1 |
| 2002/0139178 A1 | 10/2002 | Nakamura |
| 2005/0241392 A1* | 11/2005 | Lyubchenko .......... G01Q 60/34 73/431 |
| 2006/0043289 A1* | 3/2006 | West ...................... G01Q 30/14 250/309 |
| 2011/0048115 A1* | 3/2011 | Ota ........................ B82Y 35/00 73/64.56 |
| 2014/0289910 A1* | 9/2014 | Fukuma ................ G01Q 30/18 850/1 |

(Continued)

FOREIGN PATENT DOCUMENTS

JP 2002-286614 A 10/2002
JP 2009-058231 A 3/2009

*Primary Examiner* — Wyatt A Stoffa
(74) *Attorney, Agent, or Firm* — Muir Patent Law, PLLC

(57) ABSTRACT

A holding member, a sample container, and a mounting member are used in a scanning probe microscope. The mounting member is made of an elastically deformable material such as a rubber material. The mounting member includes an annular main body. When the mounting member is mounted on the holding member and the sample container, the holding member is inserted into the sample container while the main body of the mounting member is elastically deformed along an outer circumferential surface of the sample container. One end of the mounting member is detached from the outer circumferential surface of the sample container, and brought into close contact with an outer circumferential surface of the holding member. When the holding member and the sample container are relatively moved, the main body of the mounting member is elastically deformed.

10 Claims, 5 Drawing Sheets

(56) References Cited

U.S. PATENT DOCUMENTS

| | | | |
|---|---|---|---|
| 2015/0135374 A1* | 5/2015 | Sakai | G01Q 10/00 850/1 |
| 2015/0150163 A1* | 5/2015 | Viani | G01Q 30/20 850/1 |
| 2015/0192604 A1* | 7/2015 | Yamamoto | G01Q 30/02 850/18 |
| 2015/0338438 A1* | 11/2015 | Viani | G01Q 30/20 850/18 |
| 2016/0041200 A1* | 2/2016 | Fine | G01Q 60/20 850/31 |
| 2017/0168089 A1* | 6/2017 | Viani | G01Q 30/20 |

* cited by examiner

SAMPLE CONTAINER MOUNTING MEMBER AND SAMPLE CONTAINER SEALING METHOD

CROSS REFERENCE TO RELATED APPLICATIONS

This application claims priority to Japanese patent Application No. 2018-096133 filed on May 18, 2018, the entire disclosure of which is incorporated by reference herein.

BACKGROUND OF THE INVENTION

Field of the Invention

The present invention relates to a sample container mounting member used in a scanning probe microscope, in which a cantilever held by a holding member is brought close to a sample disposed in a bottomed tubular sample container and a surface image of the sample is acquired by scanning the cantilever along a surface of the sample with the holding member inserted into the sample container, and a method for sealing the sample container used in the scanning probe microscope.

Description of the Related Art

Conventionally, a scanning probe microscope is used as a device that inspects a fine surface shape of a sample. In the scanning probe microscope, a probe of the cantilever is moved relative to the surface of the sample to perform scanning, which allows detection of a change in physical quantity (such as a tunnel current and interatomic force) acting between the cantilever and the sample surface during the scanning. A relative position of the cantilever is feedback-controlled such that the physical quantity is kept constant during the scanning, so that a surface shape of the sample can be measured based on a feedback amount.

As a case of observing a sample using a scanning probe microscope, sometimes in-solution observation is performed as the case that the sample is observed using the scanning probe microscope. In the in-solution observation, the cantilever is lowered into a solution while the sample is immersed in the solution, and the probe is brought into contact with the sample surface. Then, the sample surface can be observed in the solution by horizontally scanning the cantilever in the solution (for example, JP-A-2002-286614 and JP-A-2009-58231).

In the scanning probe microscope described in Patent Document 1, while the sample and the solution are introduced into the sample container, a second solution is introduced above the solution. That is, in the sample container, the upper surface of the solution is covered with the second solution. The cantilever is inserted into the sample container in this state, and the cantilever is scanned with respect to the sample surface. In this way, evaporation of the solution is prevented by covering the solution with the second solution.

In the scanning probe microscope described in Patent Document 2, an O-ring is provided between a base on which the cantilever is fixed and a sample holder having a flat plate shape. The sample and the solution are introduced into a space surrounded by the base, the sample holder, and the O-ring. In this way, the evaporation of the solution is prevented by surrounding the solution with the base, the sample holder, and the O-ring.

SUMMARY OF THE INVENTION

In the method described in Patent Document 1, in the case that specific gravities of the solution and the second solution are close to each other, or in the case that these solutions are easy to mix, there is a problem in that the observation of the sample cannot successfully be performed.

In the method described in Patent Document 2, because a gap is easily formed between the base, the sample holder, and the O-ring, the sealed state is hardly maintained, or the distance between the cantilever and the sample surface is hardly adjusted. Due to a problem that the O-ring becomes an obstacle during the observation of the sample and restriction of a size in a height direction (the size of the O-ring), the observation cannot be performed depending on the shape of the sample.

The present invention has been made in view of the above circumstances, and an object of the present invention is to provide a sample container mounting member and a method for sealing a sample container, each for being able to surely seal the sample container and smoothly observe the sample.

Another object of the present invention is to provide a sample container mounting member and a method for sealing a sample container, each for being able to smoothly observe the sample according to shapes of various samples.

(1) The present invention provides a sample container mounting member used in a scanning probe microscope, in which a cantilever held by a holding member is brought close to a sample disposed in a bottomed tubular sample container and a surface image of the sample is acquired by scanning the cantilever along a surface of the sample with the holding member inserted into the sample container. The sample container mounting member includes an annular main body that is mounted while being elastically deformed along an outer circumferential surface of the sample container.

With this configuration, the holding member is inserted into the sample container while the main body of the sample container mounting member is elastically deformed along the outer circumferential surface of the sample container. In this state, when one end of the mounting member is detached from the outer circumferential surface of the sample container and brought into close contact with an outer circumferential surface of the holding member, a region between the sample container and the holding member can surely be sealed by the mounting member.

Consequently, the evaporation of the solution can be prevented when the solution is introduced into the sample container to observe the sample.

The main body of the sample container mounting member is elastically deformable.

For this reason, when the holding member and the sample container are relatively moved to scan the cantilever, the main body of the sample container mounting member is elastically deformed.

As a result, the cantilever can smoothly be operated with respect to the surface of the sample.

Thus, the sample can smoothly be observed.

The main body of the sample container mounting member is elastically deformed, so that the distance between the holding member holding the cantilever and the sample container containing the sample can variously be adjusted.

Consequently, the sample can smoothly be observed according to the shapes of various samples.

(2) In the main body, a length of an inner circumference in a state where the main body is not elastically deformed may be shorter than a length of an outer circumference of the sample container, and be shorter than an outer circumference of the holding member.

With this configuration, due to elastic force of the main body of the elastically deformed sample container mounting member, the main body of the sample container mounting member can firmly be brought into close contact with the outer circumferential surface of the sample container and the outer circumferential surface of the holding member.

(3) The present invention provides a method for sealing a sample container used in a scanning probe microscope, in which a cantilever held by a holding member is brought close to a sample disposed in a bottomed tubular sample container and a surface image of the sample is acquired by scanning the cantilever along a surface of the sample with the holding member inserted into the sample container. The method for sealing the sample container includes a mounting step and a sealing step. In the mounting step, a mounting member made of an elastic body is mounted while being elastically deformed along an outer circumferential surface of the sample container. In the sealing step, one end of the mounting member is detached from the outer circumferential surface of the sample container while the holding member is inserted into the sample container, and the sample container is sealed by bringing one end into close contact with an outer circumferential surface of the holding member.

According to the present invention, when one end of the mounting member is detached from the outer circumferential surface of the sample container and brought into close contact with an outer circumferential surface of the holding member, a space between the sample container and the holding member can surely be sealed by the mounting member. The main body of the sample container mounting member is elastically deformable. For this reason, when the holding member and the sample container are relatively moved to scan the cantilever, the main body of the sample container mounting member is elastically deformed. As a result, the cantilever can smoothly be operated with respect to the surface of the sample. Thus, the sample can smoothly be observed.

DETAILED DESCRIPTION OF THE PREFERRED EMBODIMENT

1. Entire Configuration of Scanning Probe Microscope

Figure 1:
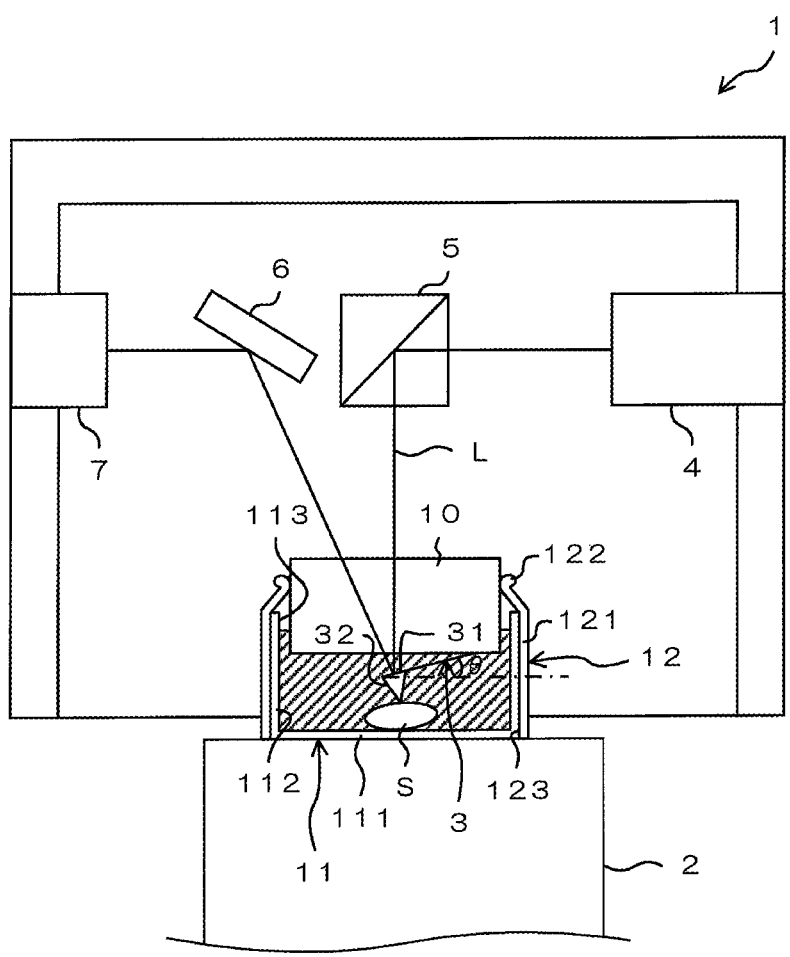
FIG. 1 is a schematic diagram illustrating a configuration example of a scanning probe microscope in which a sample container mounting member according to an embodiment of the present invention is used.

FIG. 1 is a schematic diagram illustrating a configuration example of a scanning probe microscope 1 in which a mounting member (sample container mounting member) 12 according to an embodiment of the present invention is used.

For example, the scanning probe microscope 1 (SPM) includes a stage 2, a cantilever 3, a light irradiator 4, a beam splitter 5, a mirror 6, a light receiving unit 7, and a holding member 10. In the scanning probe microscope 1, the cantilever 3 is scanned on a surface of a sample S to obtain an uneven image of the surface of the sample S. A sample container 11 that contains the sample S and a mounting member 12 that keeps an inside of the sample container 11 in a sealed state are used in the scanning probe microscope 1.

In the scanning probe microscope 1, the sample S is placed in the sample container 11 together with an solution. The sample container 11 that contains the solution and the sample S is placed on the stage 2. In the scanning probe microscope 1, the cantilever 3 is relatively moved along the surface of the sample S by displacing the stage 2. Alternatively, the cantilever 3 (holding member 10) is displaced while the stage 2 is fixed, which allows the cantilever 3 to be relatively moved along the surface of the sample S.

For example, a piezoelectric element (not illustrated) is provided on an outer circumferential surface of the stage 2. The stage 2 is appropriately deformed by applying a voltage to the piezoelectric element, and a position of the sample S on the stage 2 changes.

The cantilever 3 is disposed at a position opposed to the sample S in the sample container 11. For example, the cantilever 3 is an extremely small elongated member having a length of about 150 μm and a width of about 30 μm to about 40 μm, and is cantilevered by the holding member 10. A reflecting surface 31 is formed at a leading end on a free end side of the cantilever 3. In the cantilever 3, a probe 32 is provided on the surface on opposite side to the reflecting surface 31. The uneven image of the surface of the sample S can be obtained by moving the probe 32 along the surface of the sample S.

The holding member 10 is formed in a plate shape having a predetermined thickness. The holding member 10 is made of a transparent material such as glass.

The light irradiator 4 includes a laser light source such as a semiconductor laser.

The beam splitter 5 is disposed at a position on which the light from the light irradiator 4 is incident. The light from the light irradiator 4 passes through the beam splitter 5, and is incident on the cantilever 3 through the holding member 10.

Another optical member such as a collimating lens and a focus lens (neither is illustrated) may be provided in an optical path from the light irradiator 4 to the cantilever 3. In this case, after the light emitted from the light irradiator 4 is changed into parallel light by the collimating lens, the parallel light can be condensed by the focus lens, and guided onto the side of the cantilever 3.

In addition to the beam splitter 5, the collimating lens and the focus lens constitute an optical system that guides the light emitted from the light irradiator 4 to the cantilever 3. The configuration of the optical system is not limited to this configuration, but the optical system may be configured such that at least one of the above optical members is not provided.

The mirror 6 guides the light reflected by the reflecting surface 31 of the cantilever 3 to the light receiving unit 7 by reflecting the light again.

The light receiving unit 7 includes a photodiode such as a quadrant photodiode.

In the scanning probe microscope 1, the sample S and the solution are contained in the sample container 11 in the case that the sample S is observed. The sample container 11 that contains the solution and the sample S is placed on the stage 2. At this point, as described later, the holding member 10 (the cantilever 3) is disposed in the sample container 11, and a region between the sample container 11 and the holding member 10 is sealed by the mounting member 12.

In this state, the probe 32 of the cantilever 3 is moved relative to the surface of the sample S, and scanned along the surface of the sample S. A physical quantity such as interatomic force acting between the probe 32 of the cantilever 3 and the surface of the sample S changes during the scanning.

The laser light is emitted from the light irradiator 4. The light emitted from the light irradiator 4 is transmitted through the holding member 10 via the beam splitter 5, and travels toward the reflecting surface 31 of the cantilever 3. The light (reflected light) reflected on the reflecting surface 31 of the cantilever 3 is transmitted through the holding member 10, reflected by the mirror 6 again, and received by the light receiving unit 7.

The reflecting surface 31 of the cantilever 3 is inclined by a predetermined inclination angle θ with respect to a direction orthogonal to an optical axis L of the light emitted from the light irradiator 4. Thus, in the case that the probe 32 of the cantilever 3 is moved along the unevenness of the surface of the sample S, the cantilever 3 is bent to change the inclination angle θ of the reflecting surface 31. At this point, the position where the light reflected from the reflecting surface 31 is received changes in the light receiving unit 7. Thus, a change of the physical quantity acting between the probe 32 of the cantilever 3 and the surface of the sample S during the scanning can be detected based on the change of the light receiving position of the reflected light in the light receiving unit 7. The relative position of the probe 32 of the cantilever 3 is feedback-controlled such that the physical quantity is kept constant, and the surface shape of the sample S is measured based on a feedback amount.

2. Configurations of Sample Container and Mounting Member

Figure 2A:
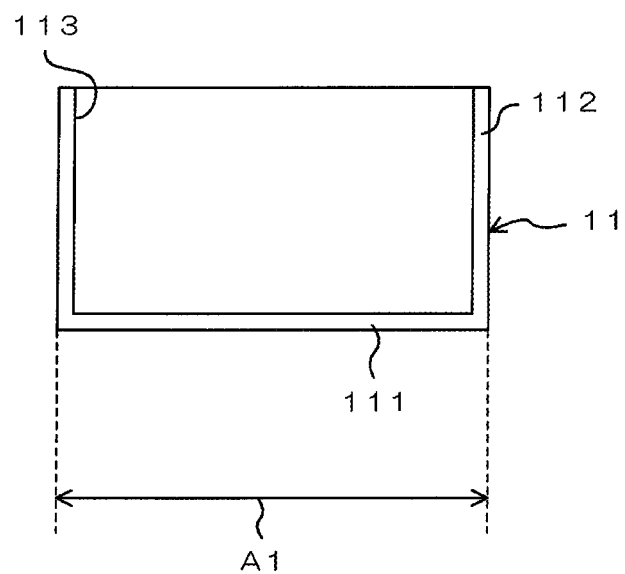
FIG. 2A is a view illustrating a method for sealing the sample container, and illustrating a state in which the sample container and the sample container mounting member are prepared.
Figure 2A:
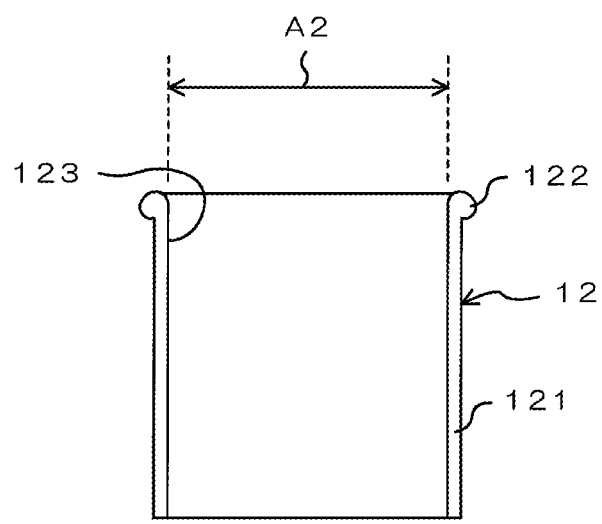

FIG. 2A is a view illustrating a method for sealing the sample container 11, and illustrating a state in which the sample container 11 and the mounting member 12 are prepared. The configurations of the sample container 11 and the mounting member 12 will be described with reference to FIG. 2A.

As illustrated in FIG. 2A, the sample container 11 is formed in a bottomed tubular shape (bottomed cylindrical shape). For example, the sample container 11 is made of a glass material or an acrylic resin. The sample container 11 includes a bottom wall 111 and a circumferential wall 112.

The bottom wall 111 is formed in a disc shape. Although not illustrated, a stainless steel plate is provided in the bottom wall 111.

The circumferential wall 112 extends upward from a circumferential edge of the bottom wall 111. A space on an inner side of the circumferential wall 112 is formed as an opening 113.

A magnet is provided on the stage 2 of the scanning probe microscope 1. In the state (see FIG. 1) in which the sample container 11 is placed on the stage 2, the magnet of the stage 2 and the stainless steel plate of the sample container 11 are attracted to each other by magnetic force.

For example, the sample container 11 has a diameter of about 1 cm. A1 is a length of the outer circumference of the sample container 11.

The mounting member 12 includes a main body 121 and a protrusion 122. For example, the mounting member 12 is made of an elastic body such as a rubber material.

The main body 121 is formed in an annular shape. A space on the inner side of the main body 121 is formed as an opening 123.

The protrusion 122 protrudes outward from the outer circumferential surface at one end (upper end in FIG. 2A) in an axial direction of the main body 121.

A length A2 of an inner circumference of the main body 121 in a state where the mounting member 12 (main body 121) is not elastically deformed is shorter than the length A1 of the outer circumference of the sample container 11. The length A2 of the inner circumference of the main body 121 in the state where the mounting member 12 (main body 121) is not elastically deformed is shorter than a length A3 of the outer circumference of the holding member 10 (see FIG. 2C).

A length (size) in the axial direction (vertical direction in FIG. 2A) of the main body 121 in the state where the mounting member 12 (main body 121) is not elastically deformed is longer than a length (size) in the axial direction (vertical direction in FIG. 2A) of the sample container 11.

3. Mounting of Mounting Member on Sample Container and Holding Member

Figure 2B:
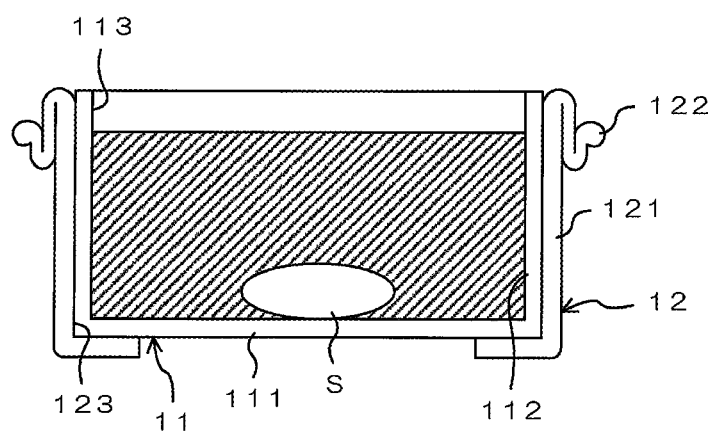
FIG. 2B is a view illustrating the method for sealing the sample container, and illustrating a state in which the sample container mounting member is mounted on the sample container.
Figure 2C:
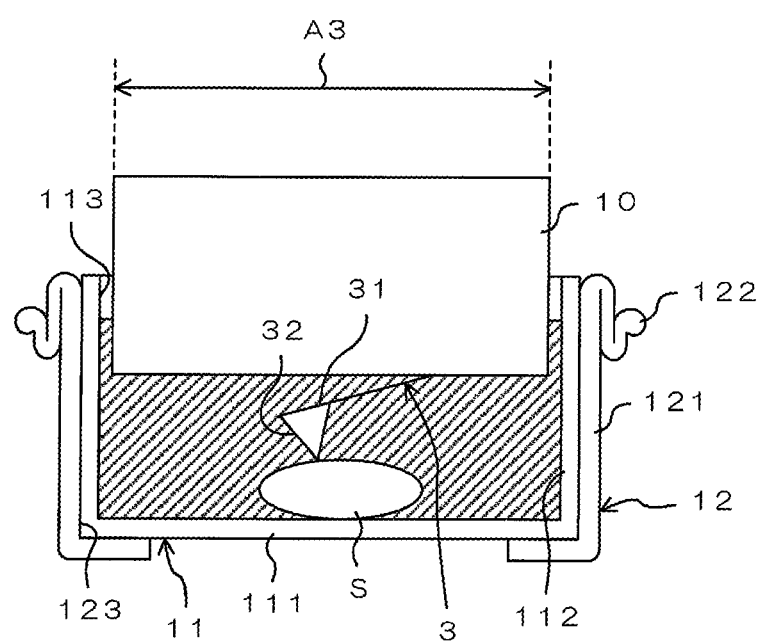
FIG. 2C is a view illustrating the method for sealing the sample container, and illustrating a state in which a holding member is inserted into the sample container.
Figure 2D:
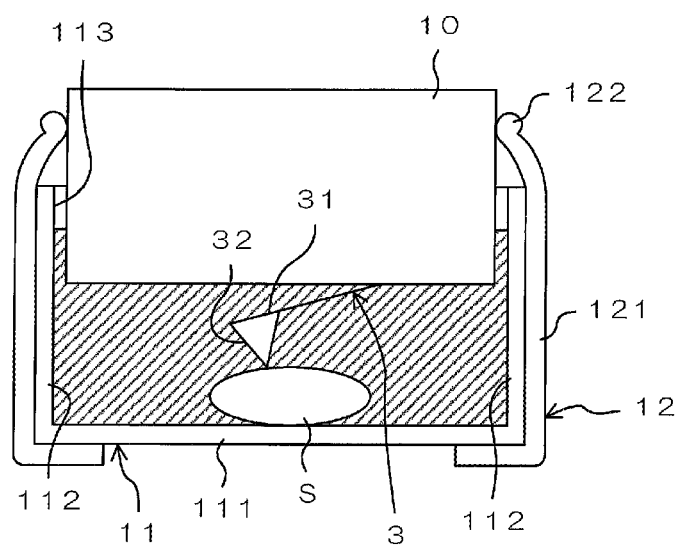
FIG. 2D is a view illustrating the method for sealing the sample container, and illustrating a state in which the sample container mounting member is brought into close contact with the holding member.

FIGS. 2A to 2D are views illustrating the method for sealing the sample container 11. Specifically, FIG. 2A illustrates the state in which the sample container 11 and the mounting member 12 are prepared. FIG. 2B illustrates the state in which the mounting member 12 is mounted on the sample container 11. FIG. 2C illustrates the state in which the holding member 10 is inserted into the sample container 11. FIG. 2D illustrates the state in which the mounting member 12 is brought into close contact with the holding member 10.

In the case that observation (in-solution observation) of the sample S is performed using the scanning probe microscope 1, first, a user prepares the sample container 11 and the mounting member 12 as illustrated in FIG. 2A. As described above, the length A2 of the inner circumference of the main body 121 in the state where the mounting member 12 is not elastically deformed is shorter than the length A1 of the outer circumference of the sample container 11.

As illustrated in FIG. 2B, the user elastically deforms the mounting member 12 (main body 121) so as to expand the mounting member 12, and inserts the sample container 11 into the main body 121 (opening 123) of the mounting member 12. At this point, the user releases user's hand from the mounting member 12, which allows the mounting member 12 (main body 121) to be brought into close contact with the outer circumferential surface of the sample container 11. Consequently, the mounting member 12 is mounted while being elastically deformed along the outer circumferential surface of the sample container 11 (mounting step). At this point, due to the elastic force of the mounting member 12 (contracting force of the mounting member 12), the mounting member 12 is firmly mounted on the outer circumferential surface of the sample container 11.

As described above, the axial length of the main body 121 in the state where the mounting member 12 is not elastically deformed is longer than the axial length of the sample container 11. For this reason, for example, the main body 121 of the mounting member 12 is mounted on the sample container 11 by folding back a part of the main body 121.

The user introduces the sample S and the solution into the sample container 11 in this state.

Subsequently, the user inserts the holding member 10 into the sample container 11 as illustrated in FIG. 2C. Specifically, while the side on which the cantilever 3 is located downward, the holding member 10 is inserted into the opening 113 until the cantilever 3 comes close to the sample S.

Subsequently, the user pulls up one end (upper end) of the mounting member 12 as illustrated in FIG. 2D. One end (upper end) of the mounting member 12 is detached from the outer circumferential surface of the sample container 11, and mounted on the outer circumferential surface of the holding member 10 (sealing step).

Specifically, the user grips the protrusion 122 of the mounting member 12 to allow upward force to act on the protrusion 122, whereby the upper end of the mounting member 12 is detached from the outer circumferential surface of the sample container 11, and mounted on the outer circumferential surface of the holding member 10.

As described above, the length A2 of the inner circumference of the main body 121 in the state where the mounting member 12 is not elastically deformed is shorter than the length A3 of the outer circumference of the holding member 10. For this reason, due to the elastic force of the mounting member 12 (the contracting force of the mounting member 12), the mounting member 12 is firmly mounted on the outer circumferential surface of the holding member 10. In this state, the region between the sample container 11 and the holding member 10 is sealed by the mounting member 12.

In this way, the mounting member 12 is mounted on the sample container 11 and the holding member 10. The user installs the sample container 11, the holding member 10, and the mounting member 12 in this state on the scanning probe microscope 1 (see FIG. 1). Specifically, the user places the sample container 11 on the stage 2, and mounts the holding member 10 on a support mechanism (not illustrated) in the scanning probe microscope 1.

In this state, the distance between the cantilever 3 and the sample S is adjusted (the cantilever 3 is brought close to the sample S). The cantilever 3 is scanned with respect to the surface of the sample S.

At this point, the mounting member 12 is elastically deformed moderately. For this reason, interruption of the mounting member 12 is prevented in the adjustment of the distance between the cantilever 3 and the sample S and the relative movement between the cantilever 3 and the sample S.

The mounting member 12 does not interfere with the optical path. Consequently, the interruption of the mounting member 12 is prevented during the observation of the sample.

When the observation of the sample S using the scanning probe microscope 1 is completed, the holding member 10 is detached from the support mechanism (not illustrated), and the holding member 10, the sample container 11, and the mounting member 12 are separated from the stage 2.

When the mounting member 12 is detached from the holding member 10, the user pulls the sample container 11 and the mounting member 12 downward (pulls the mounting member 12 downward together with the sample container 11) such that the sample container 11 and the mounting member 12 are separated from the holding member 10. This enables the mounting member 12 to be detached from the holding member 10.

4. Function and Effect (1) In the embodiment, the mounting member 12 is made of an elastically deformable material such as a rubber material. As illustrated in FIG. 2A, the mounting member 12 includes the annular main body 121.

When the mounting member 12 is mounted on the holding member 10 and the sample container 11, while the main body 121 of the mounting member 12 is elastically deformed along the outer circumferential surface of the sample container 11 as illustrated in FIG. 2B, the holding member 10 is inserted into the sample container 11 as illustrated in FIG. 2C (mounting step). As illustrated in FIG. 2D, one end (upper end) of the mounting member 12 is detached from the outer circumferential surface of the sample container 11, and brought into close contact with the outer circumferential surface of the holding member 10. Then, the region between the sample container 11 and the holding member 10 is sealed by the mounting member 12 (sealing step).

Consequently, evaporation of the solution can be prevented when the solution is introduced into the sample container 11 to observe the sample S.

The mounting member 12 (main body 121) can elastically be deformed.

For this reason, when the holding member 10 and the sample container 11 are relatively moved to scan the cantilever 3, the main body 121 of the mounting member 12 is elastically deformed.

As a result, the cantilever 3 can smoothly be operated with respect to the surface of the sample S.

Thus, the sample S can smoothly be observed.

The main body 121 of the mounting member 12 is elastically deformed, so that the distance between the holding member 10 holding the cantilever 3 and the sample container 11 containing the sample S can variously be adjusted.

Consequently, the sample can smoothly be observed according to the shapes of various samples.

(2) In the embodiment, as illustrated in FIGS. 2A and 2C, the length A2 of the inner circumference of the main body 121 in the state where the mounting member 12 is not elastically deformed is shorter than the length A1 of the outer circumference of the sample container 11, and is shorter than the length A3 of the outer circumference of the holding member 10.

Consequently, due to the elastic force (contracting force) of the main body 121 of the elastically deformed mounting member 12, the main body 121 of the mounting member 12 can firmly be brought into close contact with the outer circumferential surface of the sample container 11 and the outer circumferential surface of the holding member 10.

As illustrated in FIG. 2A, the protrusion 122 is formed on the outer circumferential surface of the main body 121 of the mounting member 12.

Consequently, when the mounting member 12 is mounted on the holding member 10 and the sample container 11, the main body 121 of the mounting member 12 can easily elastically be deformed by applying a force to the protrusion 122.

What is claimed is:

1. A scanning probe microscope, comprising:
a stage;
a tubular sample container having a bottom;
a holding member holding a cantilever brought close to a sample disposed in the tubular sample container;
wherein a surface image of the sample is acquired by scanning the cantilever along a surface of the sample in a state where the holding member is inserted into the sample container, and
a sample container mounting member comprising an annular main body that is mounted while being elastically deformed along an outer circumferential surface of the sample container, the mounting member having the main body and a protrusion, wherein the protrusion mechanically contacts an outer circumferential surface of the holding member.

2. The scanning probe microscope according to claim 1, wherein in the main body of the mounting member, a length of an inner circumference in a state where the main body is not elastically deformed is shorter than a length of the outer circumferential surface of the sample container, and is shorter than the outer circumferential surface of the holding member.

3. The scanning probe microscope of claim 1, wherein the sample in the sample container is in a solution.

4. The scanning probe microscope of claim 3, wherein the holding member is made of a transparent material.

5. The scanning probe microscope of claim 3, wherein a portion of the tubular sample container is capable of being attracted by magnetic forces of a magnet in the scanning probe microscope.

6. The scanning probe microscope of claim 5, wherein the protrusion of the mounting member protrudes outward from an outer circumferential surface at one end of the mounting member.

7. A method of analyzing a sample in a scanning probe microscope, comprising:
   providing the scanning probe microscope of claim 1;
   further providing a light irradiator, an optical system and a light receiving unit;
   placing the sample container on the stage of the scanning probe microscope and moving the sample container relative to the holding member and cantilever such that a location of light on the light receiving unit is changed;
   wherein the cantilever scans a surface of the sample and a light reflecting surface of the cantilever reflects light to different portions of the light receiving unit;
   and wherein the mounting member elastically deforms when the stage and sample container move relative to the holding member and cantilever.

8. A method comprising:
   providing a scanning probe microscope having a stage, a tubular sample container having a bottom and a sample disposed therein, a holding member holding a cantilever, and a sample container mounting member comprising an elastic annular main body and a protrusion;
   a mounting step of mounting the mounting member such that the mounting member is elastically deformed along an outer circumferential surface of the sample container and inserting the holding member into the sample container such that the cantilever is brought close to the sample disposed in the sample container; and
   a sealing step of, while the mounting member is elastically deformed along the outer circumferential surface of the sample container, detaching a one end of the mounting member having the protrusion from the outer circumferential surface of the sample container while the holding member is inserted into the sample container, and sealing the sample container by bringing the one end of the mounting member into close contact with an outer circumferential surface of the holding member such that the protrusion mechanically contacts the outer circumferential surface of the holding member; and
   a scanning step of acquiring a surface image of the sample by scanning the cantilever along a surface of the sample in a state where the holding member is inserted into the sample container.

9. The method of claim 8, wherein the sample in the sample container is in a solution and evaporation of the solution is prevented by the sealing step.

10. The method of claim 9, wherein during the sealing step, a user grips the protrusion of the mounting member to allow upward force to act on the protrusion whereby the one end of the mounting member is detached from the outer circumferential surface of the sample container and mounted on the outer circumferential surface of the holding member.

* * * * *